(12) United States Patent
Sandstrom

(10) Patent No.: US 9,975,206 B2
(45) Date of Patent: May 22, 2018

(54) COMPOSITION OF SOLID-CONTAINING PASTE

(75) Inventor: Torbjorn Sandstrom, Banvagen (SE)

(73) Assignee: Micronic MyData AB, Taby (SE)

( * ) Notice: Subject to any disclaimer, the term of this patent is extended or adjusted under 35 U.S.C. 154(b) by 385 days.

(21) Appl. No.: 14/110,427

(22) PCT Filed: Apr. 4, 2012

(86) PCT No.: PCT/EP2012/056229
§ 371 (c)(1),
(2), (4) Date: Feb. 24, 2014

(87) PCT Pub. No.: WO2012/150105
PCT Pub. Date: Nov. 8, 2012

(65) Prior Publication Data
US 2014/0150929 A1    Jun. 5, 2014

Related U.S. Application Data

(60) Provisional application No. 61/473,679, filed on Apr. 8, 2011, provisional application No. 61/483,604, filed
(Continued)

(51) Int. Cl.
*B23K 35/02* (2006.01)
*B23K 35/362* (2006.01)
*B23K 35/36* (2006.01)

(52) U.S. Cl.
CPC .......... *B23K 35/025* (2013.01); *B23K 35/362* (2013.01); *B23K 35/3611* (2013.01); *B23K 35/3612* (2013.01)

(58) Field of Classification Search
CPC ............................ B23K 35/025; B23K 35/362
(Continued)

(56) References Cited

U.S. PATENT DOCUMENTS

| 2,156,803 | A |   | 5/1939 | Cooper et al. |
| 5,411,602 | A | * | 5/1995 | Hayes ................ B22F 1/0048 148/23 |

(Continued)

FOREIGN PATENT DOCUMENTS

| EP | 1965620 A1 | 9/2008 |
| WO | 9963027 A1 | 12/1999 |

(Continued)

OTHER PUBLICATIONS

International Preliminary Report, PCT Application No. PCT/EP2012/056229, published as WO 2012/150105, dated Jul. 18, 2013, 12 pages.
(Continued)

*Primary Examiner* — Weiping Zhu
(74) *Attorney, Agent, or Firm* — Haynes Beffel & Wolfeld LLP; Ernest J. Beffel, Jr.; Andrew L. Dunlap

(57) ABSTRACT

Solder paste compositions and methods for applying solder paste. The solder paste includes lubricating additives to the flux to decrease friction and the changes of metal to metal contact between the surfaces of the solder balls and other surfaces that the solder balls come into contact with. The solder paste also includes solder balls of different average sizes, that improves the desirable liquid like properties of the granular paste while further reducing viscosity. As such, the solder paste is used in current screen printing solder paste application methods without the risk of clogging or agglomeration of solder paste particles on surfaces. The solder paste is also used in jetting or dispensing solder paste application methods without the risk of clogging or agglomeration within the cylinders/containers or apertures and nozzles that are used within such methods.

10 Claims, 14 Drawing Sheets

Related U.S. Application Data on May 6, 2011, provisional application No. 61/486,730, filed on May 16, 2011.

(58) Field of Classification Search
USPC .......................................................... 148/24
See application file for complete search history.

(56) References Cited

U.S. PATENT DOCUMENTS

| | | |
|---|---|---|
| 5,824,628 A | 10/1998 | Coates et al. |
| 8,371,498 B2 | 2/2013 | Tanno |
| 2009/0001139 A1 | 1/2009 | Tanno |
| 2010/0043277 A1 | 2/2010 | Brunelle |

FOREIGN PATENT DOCUMENTS

| | | |
|---|---|---|
| WO | 2004050808 A2 | 6/2004 |
| WO | 2006099250 A1 | 9/2006 |
| WO | 2008075016 A1 | 6/2008 |
| WO | 2009013210 A1 | 1/2009 |

OTHER PUBLICATIONS

International Search Report, PCT Application No. PCT/EP2012/056229, published as WO 2012/150105, dated Jul. 26, 2012, 3 pages.

Chang et al, "Effect of Particle Size Distrubutions on the Rheology of Concentrate Bimodal Suspensions", The Society of Rheology, Jan./Feb. 1994, vol. 38(1), 15 pages.

\* cited by examiner

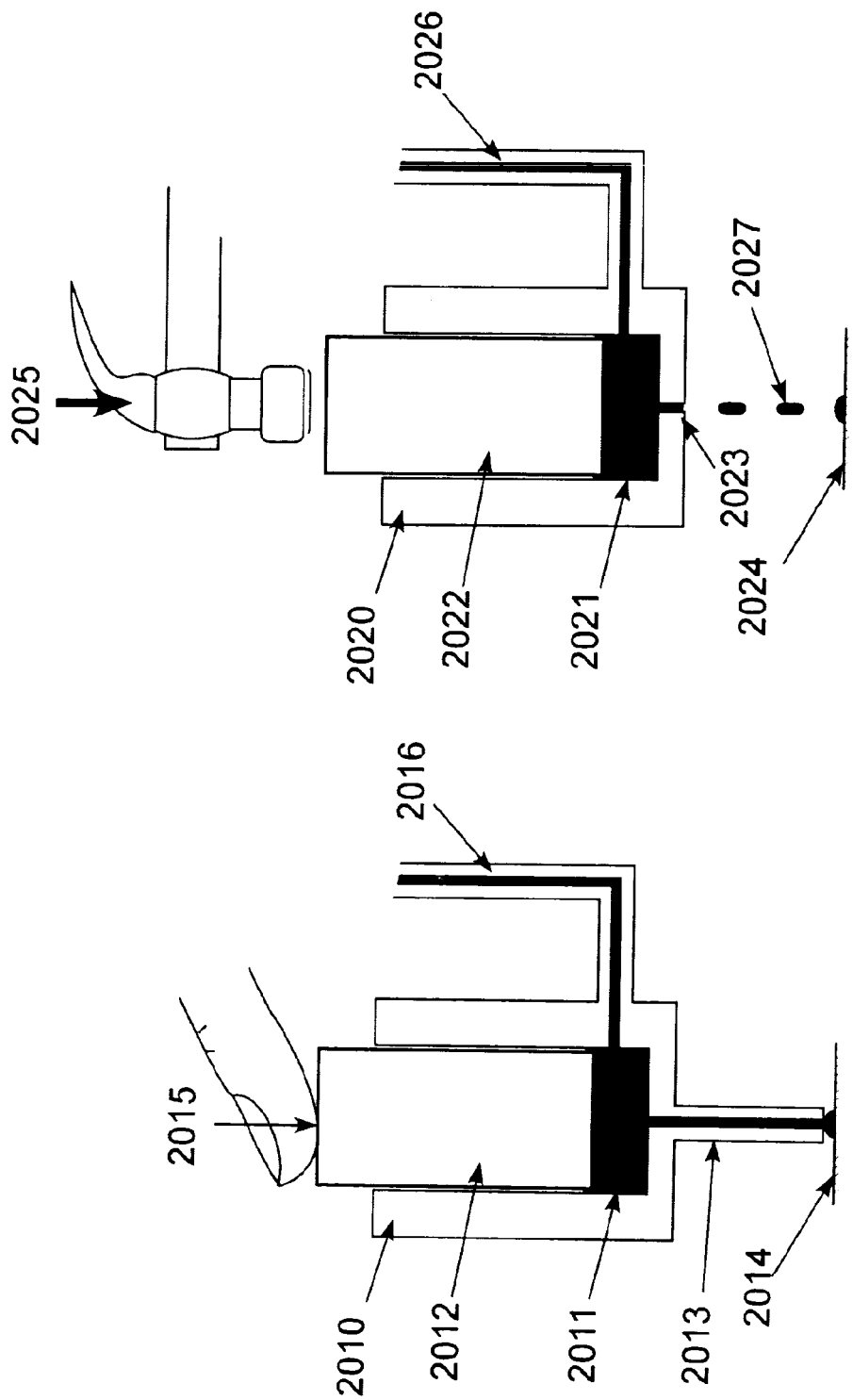

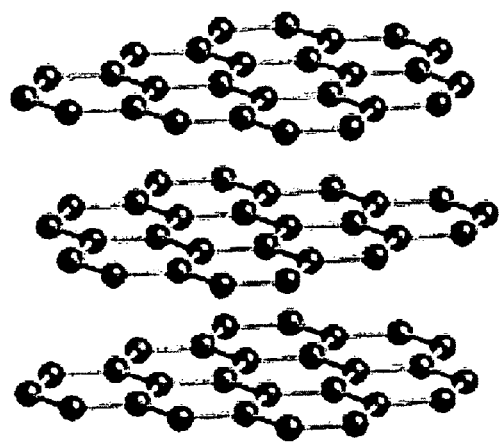
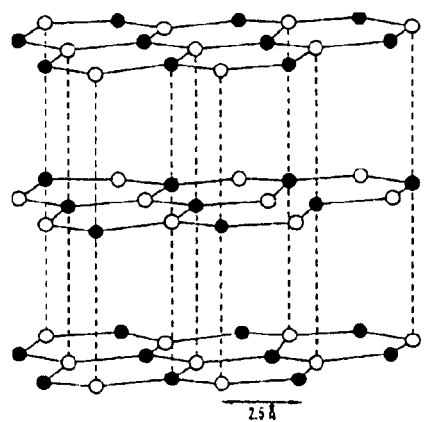
Figure 7A
Figure 7B
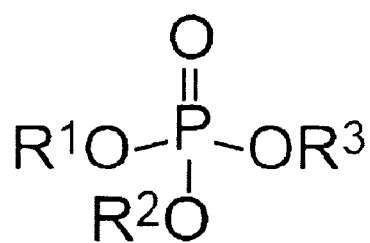
Figure 7C

*Prior art*

COMPOSITION OF SOLID-CONTAINING PASTE

RELATED APPLICATIONS

This application is a U.S. National Application under 35 U.S.C. 371 of PCT Application No. PCT/EP2012/056229, filed 4 Apr. 2012, which is related to and claims the benefit of U.S. Prov. App. No. 61/473,617, entitled "Composition of Solid-Containing Paste," by Torbjörn Sandström, filed 8 Apr. 2011. It further claims the benefit of U.S. Prov. App. No. 61/486,730, entitled, "Composition of Solid-Containing Paste," by Torbjörn Sandström, filed 16 May 2011. It also claims the benefit of U.S. Prov. App. No. 61/483,604, entitled "Material for Jetting," by Torbjörn Sandström, filed 6 May 2011.

BACKGROUND

It is known in the art to deposit solder paste on a circuit board by screen printing. The screen has to be prepared beforehand and the pattern of deposited paste cannot be changed from one board to the next. For modification or repair of the patterns it is known to use a dispensing needle.

The applicant Micronic Mydata AB has developed a method for jetting of solder paste, i.e. shooting of blobs of solder paste from a distance similar to how ink is jetted in an inkjet printer. The solder paste is pushed out through a narrow nozzle by a plunger in a cylinder and after each shot the cylinder is refilled by a pump.

The paste contains 40-60% by volume of solder balls, typically 20 microns in diameter, and the rest of the volume is solder flux. The flux has a number of functions: making the paste behave as a (thick) liquid, be tacky enough to hold components before and during soldering, protecting the solder balls from oxidation, and removing the oxide from the solder balls and other surfaces during soldering. The main component is a resin, often a natural rosin, which is tacky and also weakly acidic during soldering. There may be an activating compound for removing the oxide and making the solder wet the metal during soldering, often an organic acid and/or a halide-containing compound. There may be other components such as gelling agents to give the desired viscosity to the flux.

The solder paste technology has developed over a long time. The design of solder paste compositions is typically targeted for screen printing, as depicted in FIG. 1A, screen 1011, typically a metal screen with etched holes, is placed flat on the circuit board 1010, and the solder paste 1012 containing balls of solder and flux is scraped (1) over the surface by a knife 1013, so that the holes in the screen are filled and the surplus paste is removed. When the screen is lifted (2) patches of solder paste 1014 remains on the circuit board.

Paste may also be deposited in patches on the circuit board 2014, 2024 by dispensing, FIG. 2A, and jetting, FIG. 2B. In dispensing, the paste 2017 is held in a cylinder 2010 and pushed through a needle 2013 by a plunger 2012 by a well moderated pressure 2015, symbolically drawn as finger force although it may in real life be the force from a piezo element, an electric motor or the like. Dispensed paste may be replaced in the cylinder through a feeding or replenishing tube 2016.

Jetting is similar to dispensing with a cylinder 2020 holding the paste 2021 under a plunger or piston 2022 and a replenishment tube 2026. The needle is replaced by a narrow hole, the nozzle 2023, and the slowly varying pressure 2015 on the plunger 2012 is replaced by high pressure impulses symbolized by hammer blows 2025 and in real life implemented by a piezoelectric, magnetostrictive, thermal, etc. element. Each pressure impulse shoots out a small amount or pellet of paste 2027. Jetting is faster and more flexible than dispensing, but subjects the solder paste to more violent treatment.

One of the problems that all solder application techniques experience and particularly the jetting and dispensing techniques, is the continuous and efficient application of the solder paste through constant use of the application device. More specifically, the solder paste can agglomerate on and stick to surfaces during application due to friction between solder balls and the surfaces of the application components.

FIGS. 8 and 9 show some problems with prior art jetting and dispensing soldering application methods. In FIG. 8 the paste 3054 comprises a matrix 3053, e.g. a flux or a glue, with suspended particles 3052, e.g. spheres of solder, is ejected as a droplet 3056 when the piston 3051 is forcibly pushed down in the cylinder 3010. The viscosity is less in the matrix than in the paste, and there is a risk of segregation between the flux and solder balls. In particular, a moderate pressure inside the cylinder may force the matrix to flow out through the nozzle before the particles. The result is may be a blockage of the nozzle, since the solid fraction of the paste rises in and adjacent to the nozzle. In FIG. 9, a cylinder and nozzle filled with paste is shown in cross-section. The solid content is approximately 45-50% and the viscosity is strongly dependent on the concentration. The particles (solder spheres) are randomly distributed. Locally, the concentration of particles may by higher than the average concentration. Some regions 3073 may by random have a higher density of particles and appear to have a higher viscosity. The dense region 3073 appears almost like a solid grain in the paste and if it enters the nozzle it may clog the nozzle, at least until the random movement of particles has diluted it. The conclusion is that the granular paste may at random temporarily clog the nozzle although there are no clusters in the paste which are larger than the diameter of the nozzle.

SUMMARY

The technology disclosed relates to the solder paste used for mounting components and creating electrical connections on a circuit board or electronic component and methods for the application of solder paste to a circuit board or an electronic component. Solid-containing paste may mean solder balls in flux, but also silver or other metal particles in a liquid matrix such as an epoxy resin or other glue or polymer, carbon nanotubes in a fluid, or any of the known thick-film pastes used in electronic production. The technology improves the fluidity of the paste and reduces sticking and agglomeration of the solid material to itself and to the surfaces of the application apparatuses. In particular the technology improves the flow through jetting or dispensing apparatuses, thereby improving lifetime, reducing wear, clogging, and waste, and generally leading to more predictable behaviour over time in solder application methods.

BRIEF DESCRIPTION OF THE DRAWINGS

FIG. 2A shows dispensing of paste.
FIG. 2B shows jetting of paste.

FIG. 7A shows the crystal structure of graphite with layers or lamellae of graphene only loosely bound.

FIG. 7B shows the graphite-like (lamellar, "plate forming") structure of hexagonal boron nitride.

FIG. 7C shows the chemical structure of many organo-phosphates or phosphate

DETAILED DESCRIPTION

There is therefore a need for solder paste compositions and application tools that reduce such friction and lead to the efficient application of solder paste onto a circuit board or an electrical component. It is well known that sand cannot be pushed through a tube. The reason is that the grain in the sand form force-carrying vaults which can resist to pushing force and transfer it to the walls. The same may happen in the jetting nozzle or dispensing needle. Some particles 3071 form a vault resting on the walls of the nozzle. Even if the walls are cylindrical and smooth, load-carrying networks 3072 of particles may form and resist movement since the force pushes the particles against the sides of the nozzle and create friction.

There is an ongoing development in the electronics industry towards smaller components and smaller solder pads. Therefore both jetting and dispensing needs to be scaled down so that smaller volumes of solder paste can be ejected through smaller nozzles and thinner needles with smaller orifices, thereby further exacerbating the problem. Therefore, there is a need for a soldering paste and jet and dispensing solder application methods that minimize the amount of clogging of soldering paste within narrow nozzles and dispensing orifices.

The problem of sticking and agglomeration of solid particles in a dense dispersion during jetting or dispensing for manufacturing of electronic components is solved by the addition of 0.01% to 5% by volume, preferably 0.05%-2.0% by volume, of a lubricating compound to the paste, whereby the friction between the particles of the paste and between particles of the paste and the walls of the solder application apparatus is reduced and/or direct metal-to-metal contacts between solder balls and between the solder balls and the walls is reduced. The lubricating compound has sufficient thermal properties to coat the surfaces of the solder balls at the lower operation temperatures during the application method, while floating to the top of the deposited solder paste when the solder paste is heated to form a solder joint, such that a strong and conductive solder joint is created.

One aspect of the technology disclosed is to add hexagonal boron nitride powder to the paste to act as a lubricant.

A second aspect of the technology disclosed is to add a fluorinated polymer powder to the paste to act as a lubricant, e.g. PTFE or PFE.

A third aspect of the technology disclosed is to add a soap-like structured molecule or a weak acid with an ester such as an organic ester, to the paste to act as a lubricant. Any ester may be used including phosphate, carboxylic, stearic, boric, oleic or succinic esters.

Figure 1A:
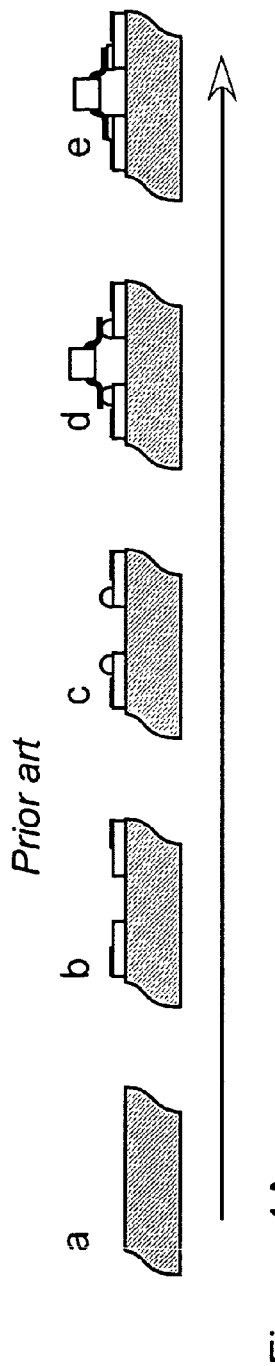
FIG. 1A shows the process flow for surface mounting of electronics.
Figure 1B:
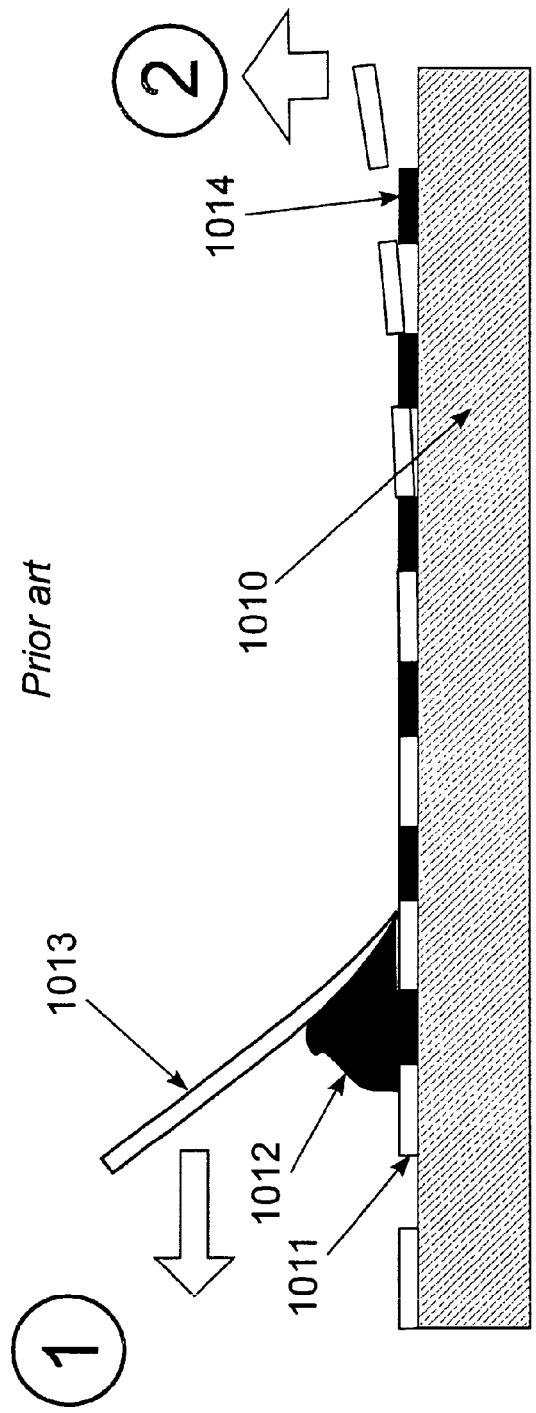
FIG. 1B shows screen printing of solder paste.
Figure 3:
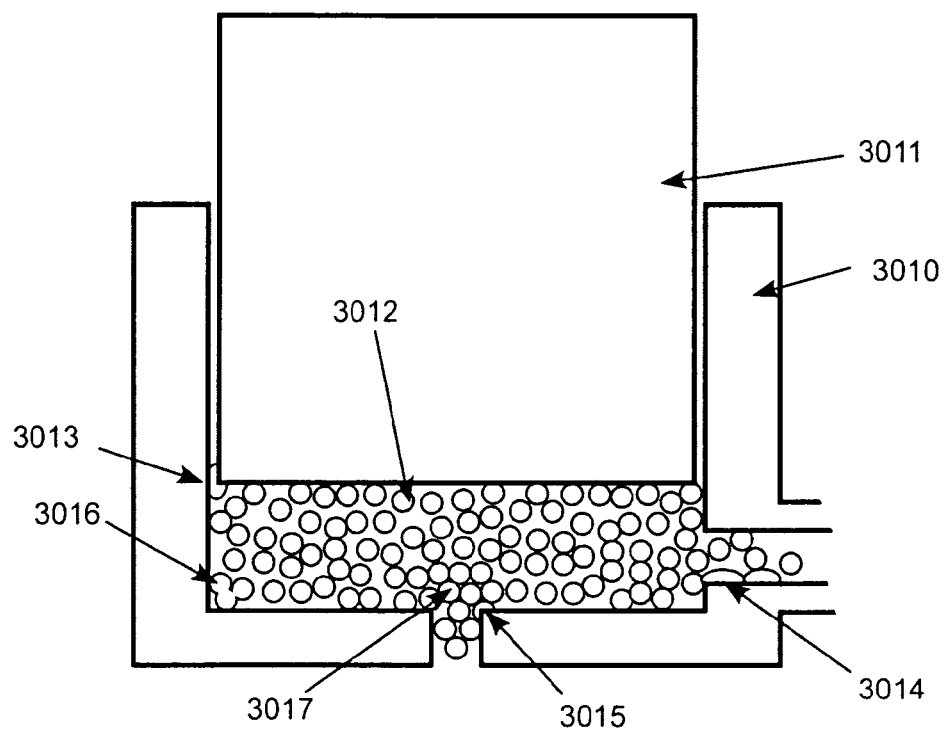
FIG. 3 shows examples of processes which affect lifetime and reliability.

FIG. 3 shows a number of mechanisms by which the lifetime and reliability of a dispensing or jetting system for granular paste may be reduced. The paste 3012 is ejected from a cylinder 3010 by a plunger 3011. The ejected paste is replaced by new paste from a feeding pump (not shown). The paste 3012 consists of particles 4011 within a viscous liquid 4012, e.g. spherical particles of solder in flux. The walls may be aluminum, steel, or any other typically hard material that is capable of withstanding the pressure generated by soldering paste after application of a force. Ideally each solder ball is transported through the system without deformation or sticking. However, as is shown, there are a number of mechanisms by which the balls and walls may be forced into hard contact causing deformation or sticking of the balls of the solder paste. Additionally, balls or fragments of balls 3013 may enter the slit between the cylinder 3010 and the plunger 3013 and become deformed and stuck 3013, eventually making the movement of the plunger more difficult. Several balls may be pushed into hard contact and form clusters 3016, which may at a later time clog the nozzle. Solder balls may slide against the wall, e.g. in narrow passages 3014 or at sharp features 3015 and deposit some of the soft metal on the wall, making other solder balls stick to the wall surface at a later time as shown by 3014 and 3015. Where the solder paste is pushed into the narrow nozzle two things happen load-carrying networks or "arcs" can form leading to the segregation of flux and solder balls. Solid particles which are pushed through a narrow tube may form "arcs" where some balls rest on the walls and other balls form solid chains. To get the paste out through the nozzle the arcs must be squashed by force or otherwise made to slide against each other. If there is a resistance of the solder balls to enter the nozzle the flux may flow between the balls and create segregation where the density of balls in the solder paste is higher before the nozzle 3017, aggravating the problem even further.

Figure 4A:
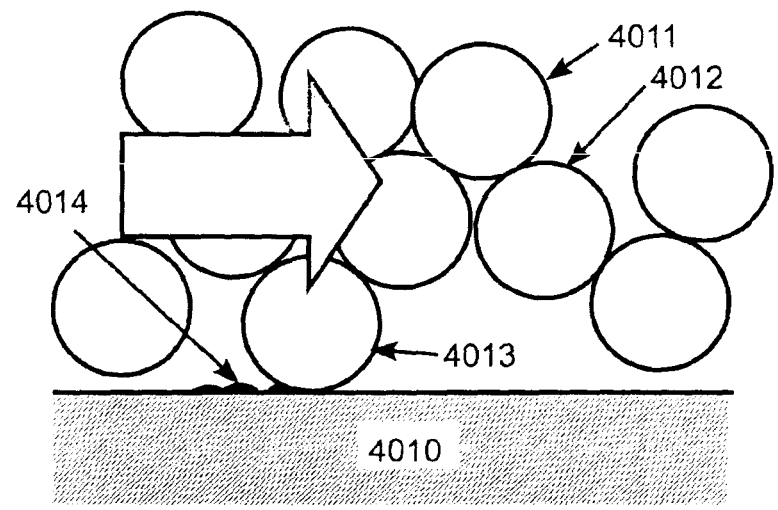
FIG. 4A shows a wall in contact with the paste, particles of the paste being rubbed against the wall and deposition of material from the particles on the wall.
Figure 4B:
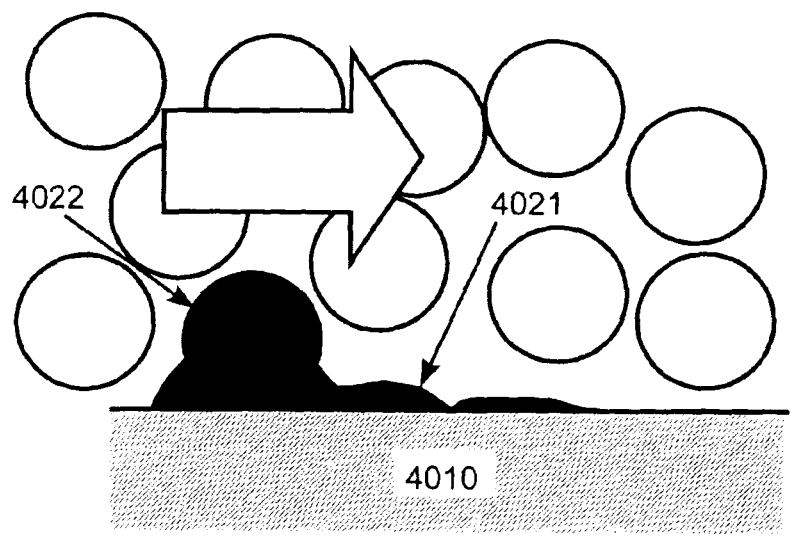
FIG. 4B shows how the deposits on the wall at a later time may have grown to significantly affect the flow of the paste along the wall.

FIG. 4 shows how material from particles 4011, 4012, 4013 of a relatively soft metal like solder flowing past a harder metal surface 4010 may start to form deposits 4014 when some of the particles 4013 are randomly forced in hard contact with the surface 4010. Once the soft material has started to settle on the hard surface 4014 the process may continue with accumulating deposits of solder balls 4021, 4022 until subsequent malfunction of the solder application mechanism results. Malfunction through the building up of deposits of solder balls can cause increased flow resistance past the surface, or alternatively the deposits 4021, 4022 can break loose and clog the system downstream.

Figure 5:
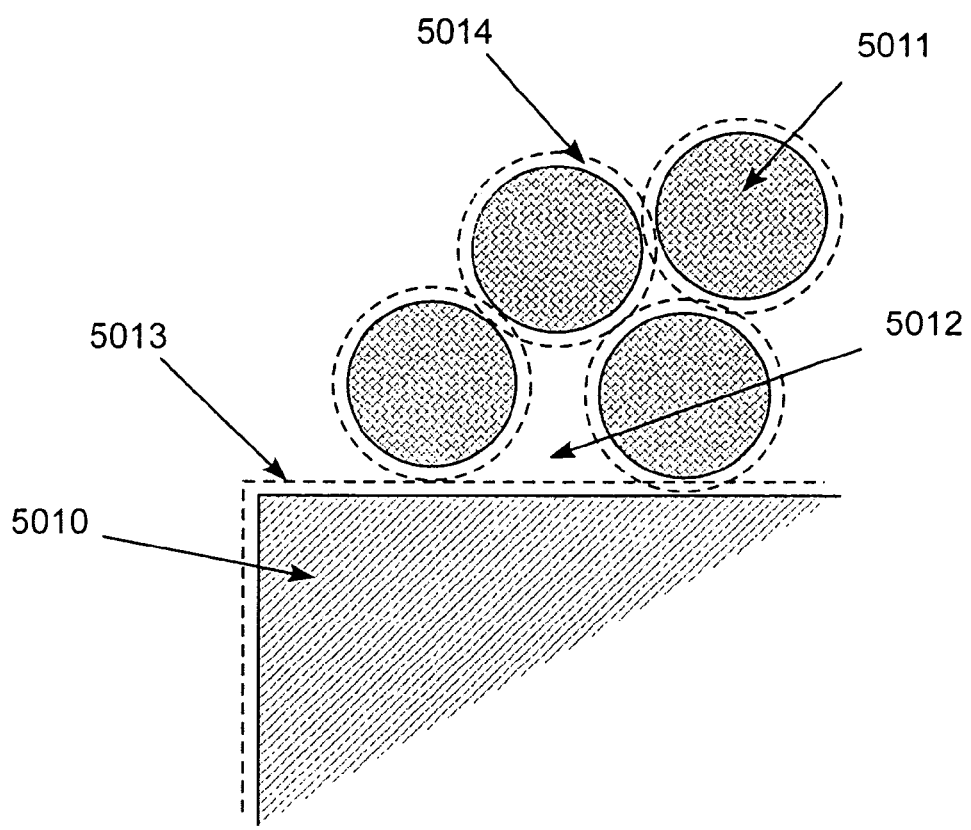
FIG. 5 shows part of the wall, the metal particles, the liquid medium, and the effect of lubricants according to the invention.

In order to solve these problems lubricating and wear-reducing agents are added to the paste to reduce the friction between the granules or particles and between the particles and the walls. Furthermore, such agents also reduce the metal to metal contact between the particles and between the particles and the walls. In the petroleum industry, certain chemical additives are used to reduce friction between gliding metal parts, such as motor oil additives. Other additives are known to be effective in reducing wear on metal surfaces in gliding contact. The disclosed technology describes adaptation of such friction-reducing and non-wear additives to solder paste intended for dispensing and jetting. FIG. 5 shows a metal part 5010 in contact with the paste comprises granules or particles 5011 and an embedding medium 5012, in what is essentially a viscous liquid. The paste may be solder paste with solder balls and flux. The additives 5013 and 5014 keep the solder balls and the metal parts from coming into direct contact, thereby reducing friction and the instances of metal to metal contact. Reduction of metal-to-metal contact and friction makes the particles slide more easily past each-other, reducing the contact force, and reducing the exchange of material between surfaces. The use of wear-reducing agents further protects the surfaces and reduces erosion and exchange of material between the surfaces.

Figure 6A:
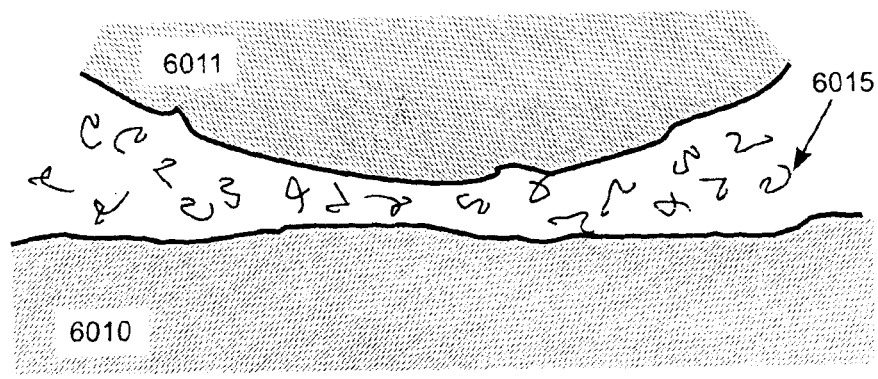
FIG. 6A shows the wall and a particle and hydrodynamic lubrication between them.

FIG. 6A shows two surfaces, one flat 6010 and one curved 6011. The surfaces are microscopically rough, as real-world surfaces tend to be. Such surfaces can represent the interaction between a solder ball and the wall of the solder application mechanism or cylinder. If the surfaces are pushed into contact with each other a pointwise high contact force will be generated and the surfaces may indent each other. Alternatively, if the surfaces are forced to slide into contact, material from one surface may be deposited on the other surface. Such deposition of material, as described previously, can lead to the agglomeration of solder balls on the surface. FIG. 6A shows the surfaces under a hydrodynamic lubrication mechanism. The space between the surfaces is filled with a viscous liquid, typically having long or complex molecules 6015. The long molecules are entangled such that it takes time when a force is applied before they can disentangle and move away. Some liquid therefore stays in the gap as long as the surfaces are sliding and direct contact between the surfaces is limited.

In one implementation of the technology disclosed, a solder paste that has a flux that includes a hydrodynamic lubrication mechanism comprising long complex molecules suspended within a liquid. These long complex molecules prevent contact between surfaces thereby reducing friction and instances of metal to metal contact. After the solder paste is deposited onto the circuit board or the electrical component, the solder paste is heated in order to form a solder joint. As the compound is heated, the flux containing the long complex molecules that serve as a lubricating agent decreases in viscosity as more energy is introduced in the form of heat into the flux. As the flux becomes less viscous, the solder balls can move more easily and sink to the bottom of the volume of applied solder paste as they have a higher density than the flux or the long complex molecules that make up the hydrodynamic lubricating agent. Therefore, the solder balls become separated from the flux material, which includes the lubricating agents, and as further heat energy is applied, the solder balls begin to coalesce and form a homogeneous volume of solder that is substantially free of the lubricating agent. As a result, a solder joint is formed that is strong and conductive.

Figure 6B:
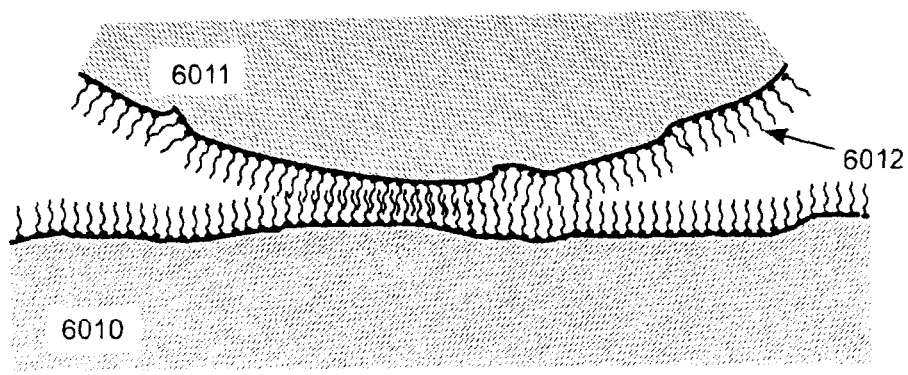
FIG. 6B shows the wall and a particle and lubrication between them based on an adsorbed lubricant making metal-to-metal contact less likely.

In FIG. 6B a surface active agent is added. In its simplest form it may be a soap where one end of the molecule has an affinity for polar environments and the other end has an affinity for fatty or oily environments. Various esters and soap molecules can be used as lubricating agents, some of which are described below. The most commonly used friction-reducing agents in motor oils are organophosphates or organic phosphate esters, with a phosphate group and a fatty tail. The phosphate group attaches to the metal surface and the fatty tail renders the surface oily and slippery. Because of the affinity between the phosphate ester and the metal surface the oily chains are strongly bound to the surface and can only be removed by applying a certain amount of force. FIG. 6B illustrates how the surfaces, e.g. metal surfaces, are substantially covered in the phosphate ester. As a result metal-to-metal contact is avoided. The oily layer covers the surface of the solder ball limiting direct metal to metal and reducing friction, resulting in less wear and clogging within the solder application apparatuses.

In application, such surface active lubricating agents must have a sufficiently high enough binding energy to remain bound to the solder particle at the lower operation temperatures, below or around 50° C., that the solder paste is exposed to during the process of application of the solder balls to the circuit board or electrical component. As a result, the lubricating agent remains bound to the solder balls, sufficiently coating the surface of the solder balls such that the previously discussed advantages of lower friction and fewer instances of metal to metal contact are observed. The binding energy of the lubricating agent, however, must be low enough, such that after the solder is deposited on the circuit board and is subsequently heated up to form the solder joint, the lubricating agent unbinds and dislodges form the surface of the solder ball and floats to the top surface of the solder paste, as the paste melts and solder balls coalesce into a homogeneous volume of solder that forms the solder joint.

Based upon an Arrhenius plot the necessary binding energy can be estimated. Based upon the plot, 50% of the surface active lubricating agent molecules adjacent to the metal surface should be bound at the operation temperature of 50° C. for solder application methods such as jetting and dispersion, and 5% of such lubricating agent molecules should remain bound at 150° C. Having only 5% of the lubricating agent molecules remaining bound to the surface at elevated temperatures ensures that a large number of surface active lubricating agent molecules unbind and float to the top of the solder paste mixture during the heating up process of the solder paste. By unbinding lubricating agent molecules from the solder balls, the solder balls sink to the bottom of the solder paste due to a higher weight and a solder joint can be formed. The desired binding energy of molecules that fit the previously described criteria is between 8 kcal/mol and 20 kcal/mol. Therefore the surface active lubricating agents should have a binding energy to the solder ball surface of between 8 and 20 kcal/mol.

Glycerol mono-oleate can be used as a surface active lubricating agent that is added to the flux of solder pastes. Glycerol mono-oleate is a friction modifier that is commercially available. The molecule includes a polar group that is based on oleic acid, which binds to the surface of the solder balls within the solder paste. Glycerol mono-oleate begins to unbind from surfaces at temperatures of between 80-130° C. As a result, at such temperatures the glycerol mono-oleate molecules separate from the surfaces of the solder balls and begin to float to the surface of the solder paste away from the volume of solder balls that float to the bottom of the solder paste and begin to coalesce into a homogeneous volume of solder. As a result, the homogenous volume of solder is substantially free of lubricating agents and can form a suitably strong and conductive solder joint.

Metal hydrocarbyl dithiophosphates as described for example in WO/2006/099250 can be used as a lubricating agent within the flux of the solder paste. Metal hydrocarbyl dithiophosphates are used as anti-wear compounds in conventional lubricating oil compositions for internal combustion engines. Multiple function polymers including a graft polymers, including graft polymers of a molybdenum compound, are described for example in WO/2006/099250 can also be used as a lubricating agent within the flux of the solder paste. Such polymers are typically uses as additives in lubricating oil compositions in internal combustion engines for anti-wear and dispersant viscosity index improvement but have the desired properties that lead to reduced friction and metal to metal contact.

Phosphate esters as an additive to motor oil are described in U.S. Pat. No. 5,824,628. The use of phosphate esters as additives to water-based functional fluids is described in WO1999063027. They are effective not only with steel, but also with tin, as shown in WO2004050808, incorporated by reference, where esters are used as lubricants for tin-coated sheet metal during deep pressing. Other known friction reducers are molybdenum compounds and grafted polymers as described in WO2006099250, incorporated by reference, and ionic liquids as described in WO2008075016, incorporated by reference. Mixing a small amount of the solid lamellar ("plate forming", graphite structure) lubricants like molybdenum disulphide, stannic sulphide, and hexagonal boron nitride into a lubricating greases and oils is described in U.S. Pat. No. 2,156,803A, and is incorporated by reference. Such application incorporated by reference describes how oil with a percent of dry lubricant can withstand extremely large bearing forces before the bearing collapses. The application also describes how a small addition of a plate forming compound reduces the wear on the bearing surfaces significantly.

Other anti-friction and anti-wear compounds like metal hydrocarbyl dithiophosphates, such as ZDDP (zinc dialkyldithiophosphate), mixed into the medium further protects the surfaces of metal objects. When such compounds are used in oil for combustion engines, the effectiveness of the anti-wear compound is shown by a smaller amount of metal particles in the oil after a period of use.

Figure 6C:
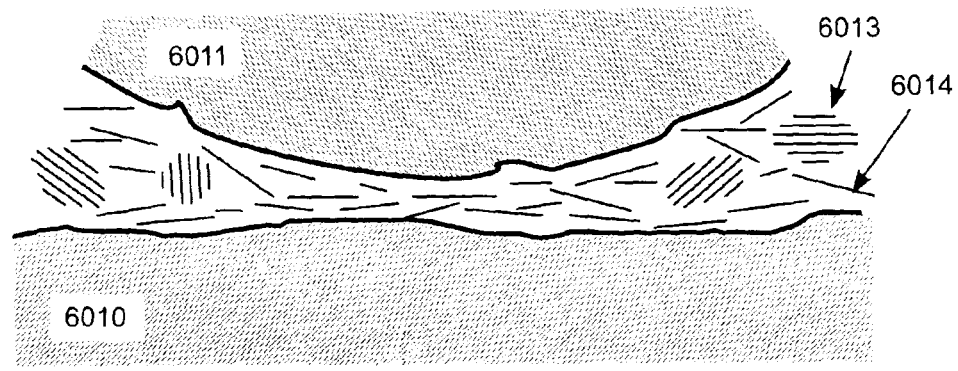
FIG. 6C shows the wall and a particle and lubrication between them based on hexagonal boron nitride lamellae making metal-to-metal contact less likely.
Figure 8:
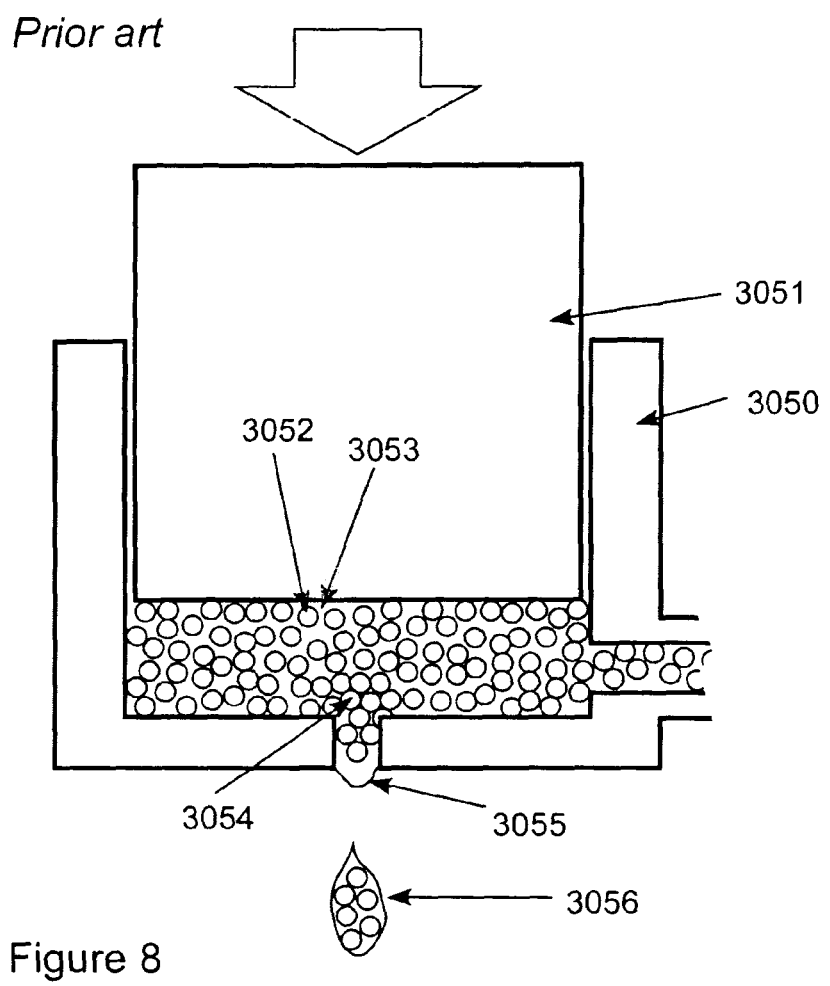
FIG. 8 shows segregation of the particles and the embedding medium in a granular suspension.
Figure 9:
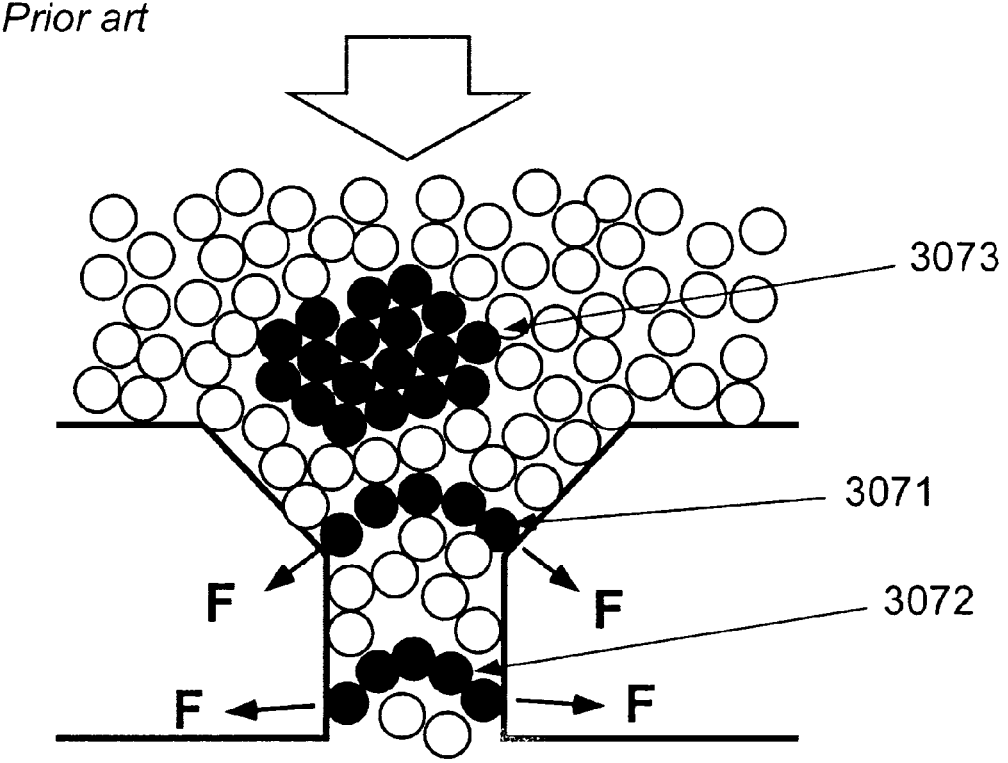
FIG. 9 shows how the flow of a granular liquid may be obstructed by random effects among the particles.

A different mode of lubrication is shown in FIG. 6C. Specifically grains of a lamellar (graphite like structure) particles 6013 like graphite, molybdenum disulphide, tungsten disulphide, titanium sulphide, stannic sulphide, zirconium selenide, or hexagonal boron nitride are added to the solder paste. These compounds consist of extremely thin lamellar structures which are held together by weak van der Wahl forces. FIG. 7A shows the structure of graphite. FIG. 7B shows the structure of hexagonal boron nitride. In these materials, the particles are sheared as the particles slide against each other with low friction across the shear planes of the lamellae like structure. After some mechanical working of the paste between the sliding surfaces the grains 6013 fragment to create smaller lamellae particles 6014 between the surfaces. The smaller lamaellae structured particles still retain the properties of the larger particles, thereby still reducing friction and metal to metal contact between the surfaces. If a blunt force is applied such that the two surfaces 6010 and 6011 are displaced directly towards each other lamellae particles will be dispersed between the surfaces and slide against the surfaces and against each other. The strength of the lamellae is extremely high and such particles are capable of withstanding the application of the blunt force, such that the lamellae particles remain intact and between the two surfaces. As a result the carrying power of the lubrication is high. Lamellar grains are used as dry lubricants or mixed into carrier liquids to form lubricating paste, or lubricating sprays. One such lamellar structure is hexagonal boron nitride (h-BN) which has little colour in nanoparticle form. Specifically the particles with a diameter of 200 nm have a bluish color and particles with a diameter of less than 100 nm become transparent. Boron nitride has high electric resistivity, and very low dry friction. The boron nitride has low affinity (i.e. non-stick properties) to many metals. It is highly inert and does not dissolve in water or acids. It is also capable of withstanding extreme temperatures without degradation, and is non-poisonous. As little as 1% of h-BN in oil is enough to reduce the wear between steel surfaces by an order of magnitude, as compared to the oil without h-BN.

In application, a solder paste that has a flux that includes a lubrication mechanism that consists of grains of particles such as lamellar structures suspended within a liquid acts similar in application process after deposition as the hydrodynamic lubricating agents discussed previously. Specifically, after the solder paste is deposited onto the circuit board or the electrical component, the solder paste is heated in order to form a solder joint. As the compound is heated, the flux containing the grains of particles that serve as a lubricating agent decreases in viscosity as more energy is introduced in the form of heat into the flux. As the flux becomes less viscous, the solder balls can move more easily and sink to the bottom of the volume of applied solder paste as they have a higher density than the other materials, including the grains of particles that serve as lubricating agents. Therefore, the solder balls become separated from the flux material, which includes the lubricating agents, and as further heat energy is applied, the solder balls begin to coalesce and form a homogeneous volume of solder that is substantially free of the lubricating agent. As a result, a solder joint is formed that has a sufficiently high strength and conductivity.

Another lubrication agent is a fine powder of a fluorinated hydrocarbon like PTFE or PFE. The working is similar to the lamellar grains, fine grains of PTFE get squeezed in between the sliding surfaces and act as a mechanical obstacle to direct mechanical contact. PTFE is one of the slipperiest materials known to man and will slide easily over the metal surfaces without causing any deformation of the surface. As a result there is less friction less metal-to-metal contact between surfaces.

Solder flux typically contains a resin, an activator which removes oxide and makes the molten solder wet on metal surfaces being soldered, and a gelling agent giving the solder flux the desired viscosity. Different flux mixtures are described in WO2009013210 which is hereby incorporated by reference.

All the compounds described above are commercially available. Graphite, molybden sulphide, boron nitride, and PTFE powder may be acquired from Henkel Corporation, 32100 Stephenson Highway, Madison Heights, Mich. 48071. Tungsten disulphide, molybden disulphide, graphite and boron nitride in nanosize powder is available from the Lower Friction Division of M.K. IMPEX CORP, 6382 Lisgar Drive, Mississauga, Ontario L5N 6X1, Canada. Further information on lubricants and additives is "Lubricant Additives Chemistry and Applications", Leslie R. Rudnick (ed.), Marcel Decker, Inc., New York (2002, 2007 Kindle edition, 2009 Second edition included by reference).

Figure 10B:
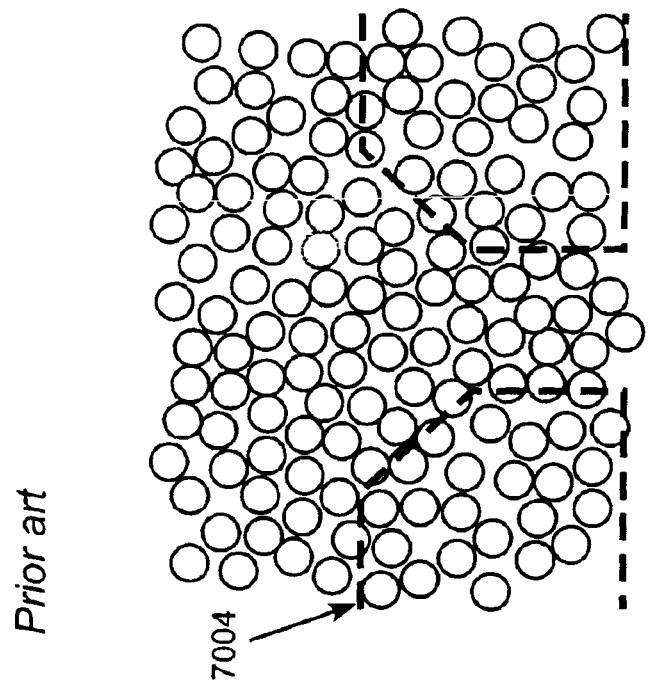
FIGS. 10A-D show the interaction between the particles in the paste with the walls in the nozzle.
Figure 10A:
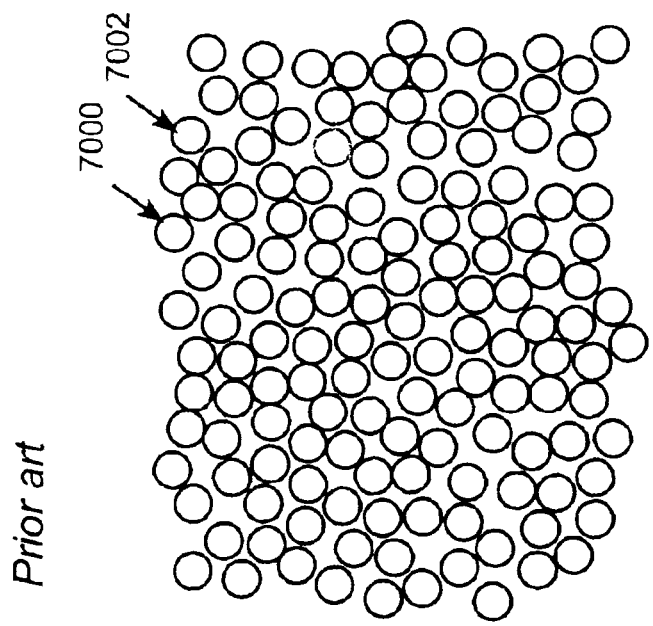
Figure 10C:
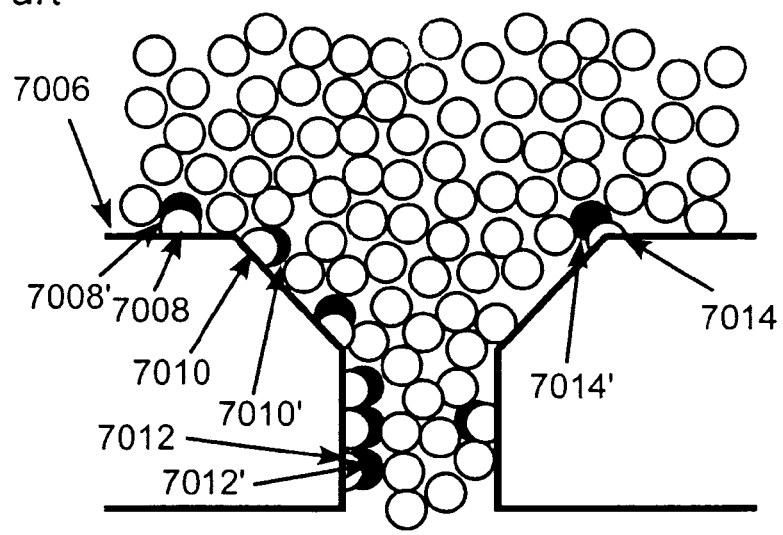

FIGS. 10A-C illustrate how soldering balls interact with each other and the walls of the solder paste application apparatuses within small orifices and nozzles leading to problems in the jetting and dispensing solder paste application methods. FIG. 10A is a cross section of a volume of a granular paste such as solder paste. The grains 7000, 7002 or solder balls are randomly distributed. In FIG. 10B, the nozzle, is drawn in the volume as thick dashed lines 7004. The paste above and inside the nozzle is a random distribution, that fills the cylinder and nozzle of the solder paste application apparatus.

FIG. 10C shows problems that result from force the paste through the aperture or nozzle. Without application of a force causing the solder paste to move through the cylinder and nozzles of the solder paste application apparatus the particles are in random positions 7008, 7010, 7012 along walls 7006. When a force is applied to the paste in order to push it through the nozzle and aperture the particles are forced to move into positions, 7008', 7010', 7012'.

Figure 10D:
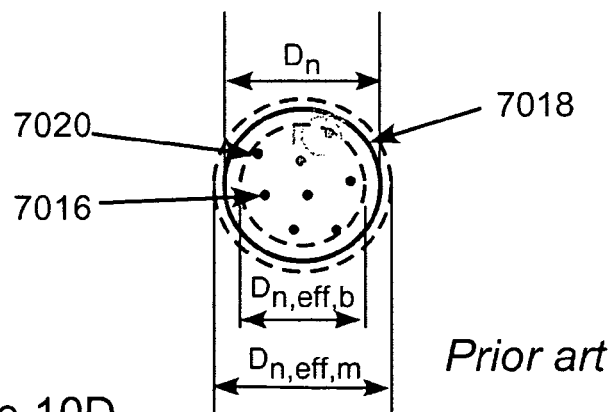

Such forced movement can cause the depletion of particles close to the walls. There is a depleted layer which is approximately $0.3*D_b$ where $D_b$ is the diameter of the balls. FIG. 10D is a bottom-up view of the nozzle with the opening 7018 and the diameter $D_n$. The dots 7020, 7016 are the centers of the balls contained within the nozzle. There are no such centers closer to the wall $0.5D_b$. An enriched layer is formed along the wall, and the net result is a depletion of approximately $0.3D_b$. The effective diameter for balls is $D_{n,eff,b}=D_n-0.6\ D_b$ and for the embedding medium the effective diameter is approximately $D_{n,eff,m}=D_n+0.6\ D_b*(1/(1-SC)-1)$ where SC is the average solid content. The effective diameter is larger than $D_n$ because in the depleted layer there is a larger concentration of solder balls along the walls than in the rest of the volume of solder paste contained within the nozzle or aperture. As a result, the relative flow of solder balls through the depletion layers along the walls is less than the flow of solder paste in the bulk solder paste medium within the nozzle or aperture.

For example, if the nozzle has a diameter $D_n$ of 150 microns and SC=50% of 20 micron particles, $D_{n,eff,b}$ is 138 microns, and $D_{n,eff,m}$ is 162 microns. The effective area is 15% smaller for particles within the bulk solder paste medium than the effective area of particles within the enriched layer that is formed along the walls. Therefore, it is clear that particles within the bulk solder paste medium, by having a smaller effective area can flow more easily than particles within the enriched layer along the walls. This can lead to the build up of particles within the enriched layer along the walls further increasing the risk of clogging. Also, such flow characteristics can lead to the ejected solder paste being depleted in the amount of solder balls and contain an excess amount of liquid or flux.

Such displacement of particles through the application of a force causing the formation of an enriched layer along the walls can also lead to segregation in the nozzle. Segregation occurs as some particles must move away from the wall and closer to the center of the nozzle before the paste can enter the nozzle. This takes energy which is seen as a flow resistance and a higher equivalent viscosity in the inlet to the nozzle. The relative importance of the depletion of particles in the ejected paste and of the densification of the paste at the center of the nozzle depends on the exact circumstances in which the solder application apparatus is operated at, such as the speed of pressure build-up and the viscosity of the medium.

Figure 11:
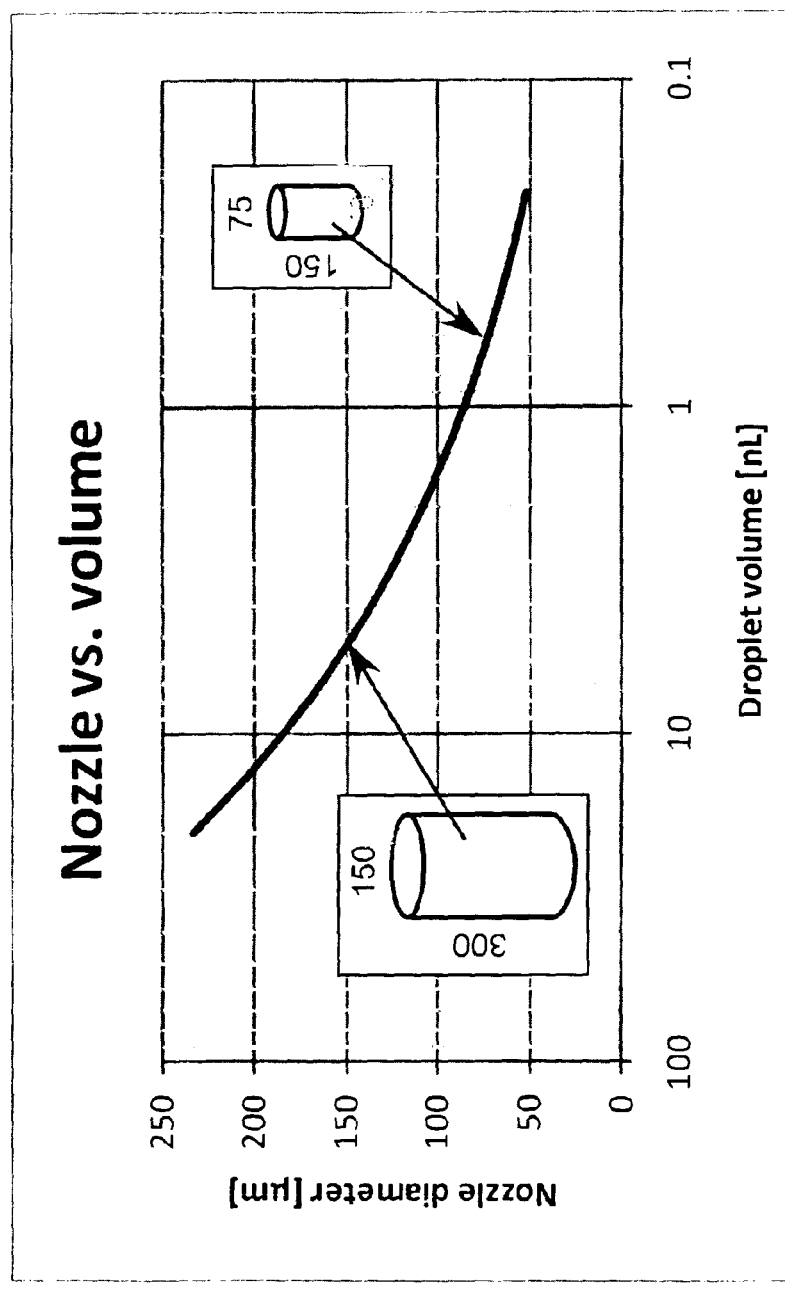
FIG. 11 shows the relationship between droplet volume and nozzle diameter.
Figure 12A:
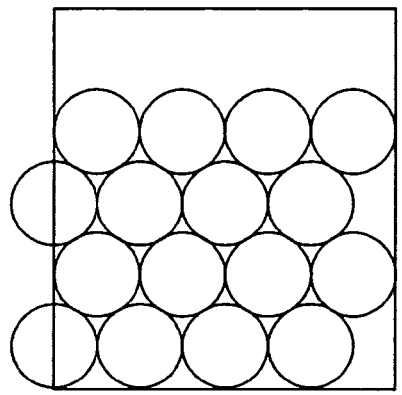
FIGS. 12A-D show how the solid content of a granular suspension can be increased by the mixing-in of smaller grains.
Figure 12B:
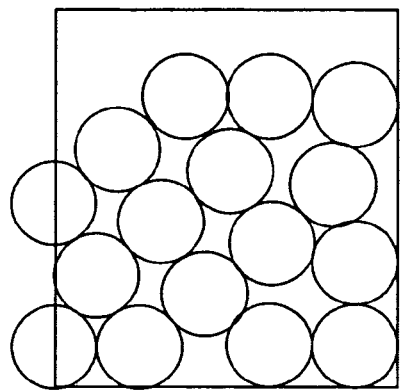
Figure 12C:
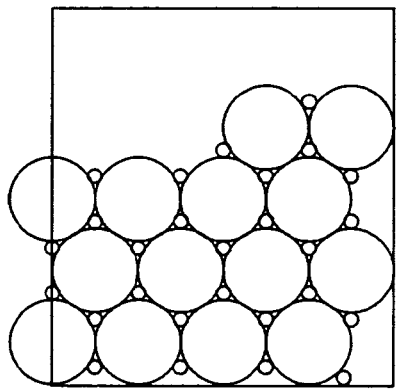
Figure 12D:
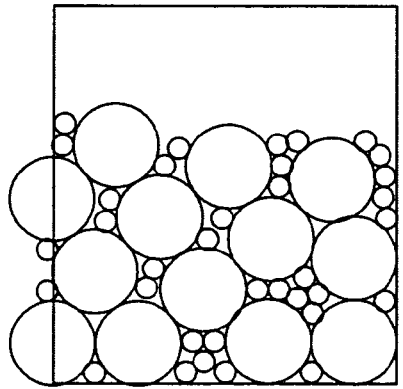

FIG. 11 shows a graph of the nozzle diameter as a function of droplet volume, assuming that the droplet cannot be made smaller than a cylinder twice as long as it is wide. Volumes below 1 nL require nozzles with openings with diameters of 80 microns in order to apply the appropriate amount of solder paste. As such the effects of the size of the solder balls within the solder paste for the previously described potential failure mechanisms become even more critical as the diameter of the nozzle decreases.

Many of the negative effects caused by solid particles within a liquid to form a granular paste can be limited by lowering the solid content and by using smaller sized solid particles. It is noteworthy that some negative effects depend on the grain size compared to the size of nozzles and needles, and some depend only on the solid content. For solder paste there are limitations to the size of the solder balls and to the lowest solder content in the solder that can be used. As a result, the technology described in this application reduces the effects of the finite size solder balls and the collisions between them, without changing solid content or grain size significantly to limit the negative effects of solid particles within pastes while still meeting the limitations of solder paste in still making the solder paste commercially relevant.

Solder paste typically consists of approximately 50% by volume of round balls of solder in a medium or matrix of a viscous, but still liquid, flux. Development has gone towards more perfectly round and more monodisperse pastes such that solder balls are substantially spherical and of a uniform size.

The highest packing density, i.e. the theoretically highest solid content in a suspension is 74%, corresponding to a regular repeated structure formed by systematically placing perfectly spherical shaped apples of all the same size at a time at the corresponding theoretical locations illustrated in the two-dimensional equivalent shown in FIG. 10A. The regular two-dimensional equivalent is the packing of circles in FIG. 10A. Some circles extend outside of the box in order to create periodic boundary conditions which allow dense packing in a finite-sized box. In FIG. 10B the apples have been poured in the box and the box has been shaken. A certain amount of disorder is introduced into the structure after the shaking and in three dimensions and in a larger box this gives approximately a 64% packing density. Applying this to solder balls within a solder paste the solid content in a paste would be 64% and there would be 36% medium in the spaces between the spheres. Both packing structures in FIGS. 10A and B are completely stiff. To deform them one has to either deform the spheres or remove them from the structure all together, effectively letting more medium into the structure. Obviously pastes with the structures of FIGS. 10A and B cannot be used. The particles that make up the paste cannot move within the liquid and have infinite viscosity and as such is impractical for commercial use. Much less dense structures than in FIG. 10A can be frozen, i.e. stiff. If the apples are poured randomly into a box and not shaken, they are not configured into the dense packing structure shown in FIGS. 10A and 10B. In such a configuration, packing densities, as low as 50% in large boxes are achievable. As a result, the apples cannot always flow freely even at such lower packing density. In small boxes (or in our case small conduits) the walls add additional restrictions placed on the apples, thereby lowering the packing density that is required for the apples to be able to move. Thus, in order for solder paste to flow without risk of obstructions within the small needles and apertures used in the jetting and dispensing application methods the paste needs to have a solid content well below 50%.

In addition, it is known in the art that the addition of much smaller particles may bring the packing density up higher, in fact arbitrarily close to 100%. In the regular packing in FIG. 7A there are regular pores where a suitably sized sphere can be fitted. As shown in FIG. 7C, the packing density can be raised above 74% by the introduction of smaller particles into the pores between the spheres. The random packing shown in FIG. 7B has larger pores than the packing of particles shown in FIG. 7A. As a result, a larger particles can be inserted into the pores than what can be inserted into the pores shown in FIG. 7A, thereby increasing the packing density. The pores that are formed around such larger particle within the pores form additional smaller pores in which a third much smaller sized particle can be fit in, and so on, until a 100% packing density is reached.

US Patent Application 2010/00432277 "Polydisperse Composite emulsions" by Patrick Brunelle, incorporated by reference, uses this to increase the solid content of an emulsified hydrocarbon fuel. Ground coal is mixed with water to form a liquid fuel which can be pumped in tubes. By using a bimodal distribution of sizes the solid content can be increased without loss of the liquid behaviour. Brunelle sites earlier literature and experiments to settle the best mixture of sizes. As stated above a small distribution of sizes does not make much difference and could actually raise the viscosity at a given solid content. However, by making the sizes between particles greatly different, the distribution is widened and as such the solid density of the suspension can be increased while still maintaining the fluid characteristic of liquids. This is illustrated in FIG. 7D which shows an increase in solid content in fuel by the methods disclosed by Brunelle: grinding the coal into two fractions and mixing them in order to make a pumpable coal slurry with a maximum of coal and a minimum of water while still retaining fluid characteristics.

Figure 13A:
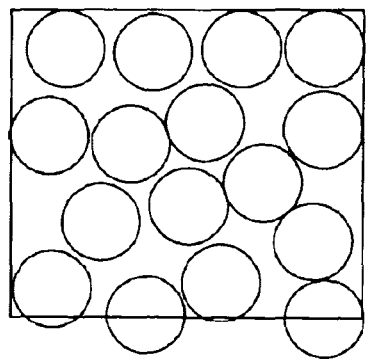
FIGS. 13A-D show how the introduction of smaller particles within the pores between the larger particles makes a thick paste behave more like a Gaussian liquid with a lowered viscosity.

The theory that was discussed in the previous paragraph can be applied to solder balls within a flux in order to create a solid paste that has a maximized solid density while still maintaining desirable fluid characteristics, such as a low viscosity. The technology disclosed is discussed with reference to FIGS. 13A-D. In FIG. 13A a volume is filled with spherical particles of roughly the same uniform size, e.g. solder balls with approximately 20 micron diameter. The solid content (in the equivalent 3D paste) is preferably in the range 40-50% or even more preferably around 45%. The viscous medium, e.g. in solder paste the flux, fills the space between the spheres. The packing is not dense, such that there is still vacancies in which the particles can move. However, since the balls are partly interlocked, the application of a shear force does not cause immediate shearing. The shear force would be concentrated on those spheres locking the shearing movement such that the spheres that do not displace to establish slippage planes. Once the shearing movement starts it continues with little additional energy, however, shearing must first be established through the formation of slipping planes. The property of dense granular pastes requiring a large amount of energy to establish the slippage plane that allow for sheering is know as shear-thinning. In order to flow more easily through apertures and nozzles it is desirable that the amount of energy needed to establish slippage planes and begin the process of shearing is low. If the energy required to begin shearing is too high, the balls within the paste do not flow and the nozzle or aperture becomes clogged. Similarly the paste shown in FIG. 13A may freeze in a small nozzle, randomly forming an interlocking network of spheres in contact. The curve describing the viscosity of paste A in FIG. 13D has a high viscosity at 45% solid fraction. If the paste is forced through a small orifice the local solid fraction increases. As shown in FIG. 13D as the local solid fraction increases up to point A', the viscosity dramatically increases leading to the clogging of the orifice or aperture.

Figure 13B:
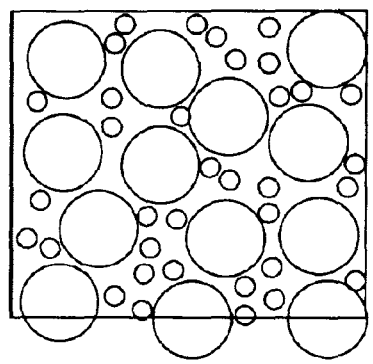

In FIG. 13B three of the large spheres are removed and replaced by the same amount of material in the shape of smaller spheres. It is immediately seen that there is more room for the large spheres to move around, and it is easier to set up a shearing movement in paste B. Paste B has less viscosity and less shear thinning. Furthermore, even if the paste is within a small orifice, corresponding to point B', the paste has a lower viscosity than that of A thereby reducing the changes of clogging by a random interlocking network of spheres. One way to view the difference between paste A and paste B is that some material in B is in the form of particles which are so small so that they act as part of the embedding medium. Therefore the viscosity does not diverge until the remaining large spheres have a density comparable to paste A.

Figure 13C:
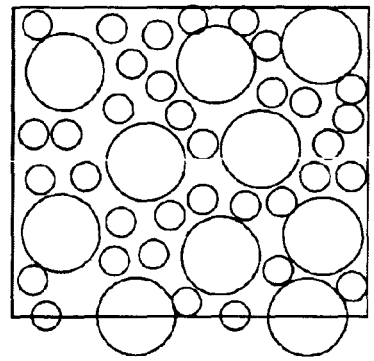
Figure 13D:
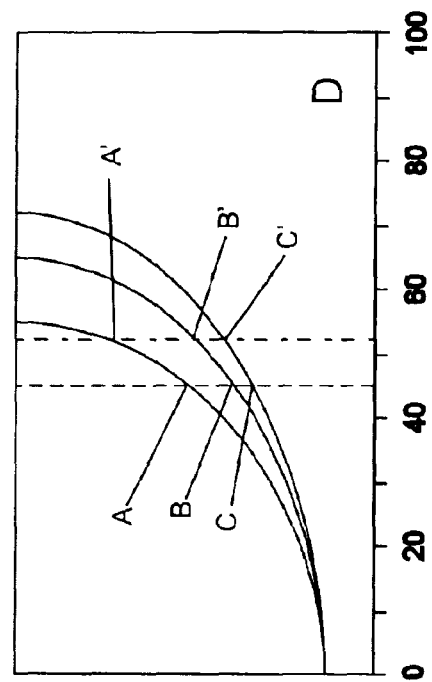

In paste C shown in FIG. 13C three more of the large spheres are removed as compared to paste B and a smaller particle material is added. Shearing begins to occur with an even smaller force than the force at which shearing occurs in paste B. This is a consequence of there being less interlocking between the large spheres. Furthermore, since the small spheres take less energy to displace once shearing begins, as shown in FIG. 13D the viscosity of paste C is even lower than the viscosity of paste B.

Pastes B and C, which represent different recipes for a new paste, address the previously discussed problems of Paste A. The forcing of either paste B or C through a small orifice will still lead to the formation of a depleted layer next to the wall of the orifice. However, the depleted layer will contain small balls and as a result less energy is required to displace the remaining large solder balls out of the way. Comparatively, in order to displace one large soldering ball in paste A, all neighbouring large balls must be displaced as well. In pastes B and C, in order to displace one large ball only the neighbouring small balls need to be displaced, as such small balls are what are in contact with a majority of the surface of the large soldering ball. Such movement of the small balls requires less energy than the movement of the large balls which in turn lowers viscosity.

By way of example of applying the theory illustrated in FIGS. 13A-D an apparatus with a nozzle that is 150 microns in diameter is used and a paste has approximately 45% solid fraction is forced through such nozzle. The solid content is 80% of solder balls with an average diameter of 20 microns and 20% of solder balls with a diameter in the range of 2-5 microns. Paste runs in standard classes, class 5 having an average size of 20 microns and class 7 having solder balls in the range 2-5 microns. One formulation can be a paste with a solid content of 80% of solder balls of class 5 and 20% of solder balls of class 7.

In a second example the nozzle is 100 microns in diameter and the paste has a solid content of 80% of solder balls of class 6 and 20% of solder balls of class 7.

In a third example the nozzle is 80 microns in diameter and the paste has a solid content of approximately 70% of solder balls of class 6 and 30% of solder balls of class 7.

Alternatively, the fraction of smaller solder balls may be approximately 20%, 15-25%, 10-30%, or 5-40% of the volume of the solid content of the paste.

The granular paste may also be a polydisperse paste with a distribution of sizes where the solder balls smaller than solder balls of a first size form 20%, 15-25%, 10-30%, 5-40% of the volume of the solid content of the paste, and the average diameter of the solder balls smaller than the solder balls of a first size is at least 3.5 times smaller than the average diameter of the solder balls of a first size.

Jetting and dispensing of solder paste are industrially important. Normal volume production of circuit boards is done by screen printing of solder paste, e.g. for production of computers and mobile phones. At the same time there are many cases where screen printing is impractical or uneconomical: small series production, high product variability, non-flat boards, package on package, etc. Any change to the jetting and dispensing processes in order to improve reliability and cost is useful. Furthermore, the disclosed technology is applicable to widely used screen printing solder paste application techniques. What has been disclosed in the present application is such an improvement and will help the electronic industry at large.

Particular Implementations

In one implementation of the disclosed technology, the solder paste includes solder balls and a flux medium. The flux medium has a lubricating agent that makes up 0.05-5% of the volume of the flux medium. Such lubricating agent acts to reduce the friction between the solder balls and the surfaces that the solder balls contact. In one implementation the lubricating agent comprises a soap like structure that has a polar region with an affinity for the surfaces of the solder balls. In another implementation, the molecules with a soap like structure have a binding energy between 8 kcal/mol and 20 kcal/mol. In one implementation, the lubricating agent is made up of a phosphate ester that is 0.05-2% of the volume of the flux medium. In an alternate implementation, the lubricating agent is made up of a glycerol ester component. In an alternate implementation, the lubricating agent is a lamellar structure material that makes up of 0.2-5% of the volume of the flux medium. The lamellar structure material can be hexagonal boron nitride. Such hexagonal boron nitride can be nanodispersion with lamellar structure particles with diameters of less than 200 nm. In an alternate implementation, the lubricating agent is a fluorinated hydrocarbon that makes up 0.2-5% of the total volume of the flux medium. In an alternate implementation, the lubricating agent is a metal hydrocarbyl dithiophosphate. In yet another alternate implementation, the lubricating agent can be any combination of two or more of the previously mentioned substances.

In one implementation of the disclosed technology, a method of applying solder paste is described using the previously mentioned solder paste compositions with a lubricating agent added to the flux medium. The solder paste is introduced and contained within a container or a cylinder. A force is applied to solder paste within the container such that a portion of the volume of solder paste is pushed through an aperture and ejected from the container. The aperture can include the opening of a nozzle that is coupled to the container.

In one implementation of the disclosed technology, the solder paste includes solder balls of a first average diameter s and solder balls of a second average diameter S. The solder balls of a first average diameter s make up a first fraction f of the total number of solder balls within the paste, while the solder balls of a second average diameter S have a fraction F of solder balls within the paste, such fractions based on weight, not number. At least 3.5 times the average diameter s of the first fraction of solder balls is less than the average diameter S of the second fraction of solder balls and the fraction F of the second solder balls is less than three times the fraction f of the first solder balls within the solder paste. In one implementation the solder balls of average diameter s are 5%-40% of the entire volume of solid phase material within the solder paste. In an alternate implementation, the average diameter s of the solder balls of the first fraction f is in the range of 2-5 microns while the average diameter S of the solder balls of the second fraction F is around 20 microns. In an alternate implementation, the bulk solder paste has a solid volume fraction of between 40%-50%. In an alternate implementation, the solder paste is a polydispersion of particles that includes a solder paste with the previously mentioned characteristics and also contains a third fraction of solder balls with an average diameter that is 3.5 times smaller than the average diameter s of the first fraction of solder balls f.

In one implementation of the disclosed technology, a method of applying solder paste is described using the previously mentioned solder paste compositions with different average sizes of solder balls. The solder paste is introduced and contained within a container or a cylinder. A force is applied to solder paste within the container such that a portion of the volume of solder paste is pushed through an aperture and ejected from the container. The aperture can include the opening of a nozzle that is coupled to the container.

The compositions and processes disclosed can be applied to other systems than solder paste, e.g. conducting glue and pastes containing other suspended particles. The compositions and processes can also be applied to pastes containing carbon nanotubes and fibers, graphene flakes and other nanoparticles.

I claim as follows:

1. A clog-free solder paste, the clog-free solder paste having a first fraction f of smaller solder balls by weight with an average diameter S and a second fraction F of larger solder balls by weight with an average diameter S, the first fraction f and second fraction F taken by weight, where 3.5 s<S and F<3f, such that:
   the larger solder balls have an average diameter that is at least 3.5 times greater than the average diameter of the smaller solder balls; and
   the clog-free solder paste includes a specific composition of the larger solder balls and the smaller solder balls that requires the weight of the larger solder balls to be less than three times the weight of the smaller solder balls.

2. The clog-free solder paste of claim 1, wherein a volume percent of the smaller solder balls having the average diameter s ranges from 5-40% of an entire volume of a solid phase material within the clog-free solder paste.

3. The clog-free solder paste of claim 2, wherein the average diameter s of the first fraction f of the smaller solder balls ranges from 2-5 microns while the average diameter S of the second fraction F of the larger solder balls is 20 microns.

4. The clog-free solder paste of claim 1, wherein a solder paste bulk has a solid volume fraction between 40-50%.

5. The clog-free solder paste of claim 1, wherein the clog-free solder paste is a polydispersion having a third fraction of even smaller solder balls, the third fraction of the even smaller solder balls having an average diameter that is at least 3.5 times smaller than the average diameter s of the first fraction f of the smaller solder balls.

6. A method of depositing solder paste onto a surface comprising:
   introducing a volume of solder paste within a container, the container having an aperture, the solder paste having a first fraction f of solder balls with an average diameter s and a second fraction F with an average diameter S, the first fraction f and the second fraction F taken by weight, where 3.5 s<S and F<3f; and
   applying a force to the volume of solder paste such that a portion of the volume of solder paste is pushed out of the container through the aperture and is deposited onto a surface.

7. The method of claim 6, wherein a volume percent of the solder balls of average diameter s within the solder paste ranges from 5-40% of an entire volume of solid phase material within the solder paste.

8. The method of claim 7, wherein the average diameter s of the first fraction f of solder balls ranges from 2-5 microns while average diameter S of the second fraction F of solder balls is 20 microns.

9. The method of claim 6, wherein a solder paste bulk has a solid volume fraction between 40-50%.

10. The method of claim 6, wherein the solder paste is a polydispersion having a third fraction of solder balls, the third fraction of solder balls having an average diameter that is at least 3.5 times smaller than the average diameter s of the first fraction f of solder balls.

* * * * *